(12) United States Patent
Prabhu et al.

(10) Patent No.: US 10,769,721 B2
(45) Date of Patent: Sep. 8, 2020

(54) INTELLIGENT PRODUCT REQUIREMENT CONFIGURATOR

(71) Applicant: Accenture Global Solutions Limited, Dublin (IE)

(72) Inventors: Preetham Prabhu, Bangalore (IN); Rajeev Divakaran Nair, Bangalore (IN); Kushal Dhammi, Dubai (AE)

(73) Assignee: Accenture Global Solutions Limited, Dublin (IE)

( * ) Notice: Subject to any disclaimer, the term of this patent is extended or adjusted under 35 U.S.C. 154(b) by 480 days.

(21) Appl. No.: 15/339,252

(22) Filed: Oct. 31, 2016

(65) Prior Publication Data

US 2018/0121797 A1 May 3, 2018

(51) Int. Cl.
*G06F 9/44* (2018.01)
*G06Q 40/02* (2012.01)
*H04L 29/08* (2006.01)
*G06N 3/02* (2006.01)

(52) U.S. Cl.
CPC ............ *G06Q 40/02* (2013.01); *H04L 67/34* (2013.01); *G06N 3/02* (2013.01)

(58) Field of Classification Search
CPC ..... G06F 8/20; G06F 8/30; G06F 8/34; G06F 8/35; G06F 16/2365; G06F 9/44505
See application file for complete search history.

(56) References Cited

U.S. PATENT DOCUMENTS

| 6,745,172 | B1* | 6/2004 | Mancisidor | ......... H04L 41/0883 706/60 |
| 2008/0127082 | A1* | 5/2008 | Birimisa | ................... G06F 8/34 717/121 |
| 2013/0104113 | A1* | 4/2013 | Gupta | ....................... G06F 8/61 717/169 |
| 2014/0075336 | A1* | 3/2014 | Curtis | ................... G06F 3/0481 715/753 |
| 2017/0139680 | A1* | 5/2017 | Proctor | ..................... G06F 8/20 |
| 2020/0019558 | A1* | 1/2020 | Okorafor | ............ G06F 21/6254 |

* cited by examiner

*Primary Examiner* — Duy Khuong T Nguyen
(74) *Attorney, Agent, or Firm* — Brinks Gilson & Lione

(57) ABSTRACT

An intelligent product requirement configurator is a tool for assisting the implementation process of application platforms by generating a recommended configuration data set describing recommended configuration settings for a selected application platform. The tool acts as a repository for capturing requirements such as banking market practice requirements, regulatory requirements, and bank specific requirements. The tool further converts the requirements into profile data and business rules that are used to configure the application platform.

22 Claims, 14 Drawing Sheets

Add New Requirement

IPRC CONFIGURATION TOOL

New Requirement

Config -> Affin Bank -> United Arab Emirates -> LOB -> Channels -> (

| | |
|---|---|
| Payment Scheme | SWIFT ▾ |
| Requirement Description | To check the mandatory fields in a SWIFT MT103 / MT202 message when initiated by a retail channel |
| Requirement Type | MARKET ▾ |
| Requirement Category | FUNCTIONAL ▾ |
| Requirement Support | FULL ▾ |

[Save]  [Reset]  [Back]

Figure 9

Manage Profiles

IPROC CONFIGURATION TOOL

Manage Profiles

Config-> Afin Bank ->United Arab Emirates->LOB - Channels->DOVE]

| Profile ID | (1 of 8) | 02345678 | -- | -- | 10 | ▼ | |
|---|---|---|---|---|---|---|---|
| | | Profile Name | | | | | Details |
| | | | | | | | Details |
| 7 | | | | | | | Details |
| | | Account Types | | | | | Details |
| 9 | | Activity Log | | | | | Details |
| 10 | | Alerts | | | | | Details |
| 11 | | | | | | | Details |
| 12 | | Alerts Classes | | | | | Details |
| 13 | | Apply Changes | | | | | Details |
| 14 | | Bulking | | | | | |
| | (1 of 8) | 02345678 | -- | -- | 10 | ▼ | |

Save  Reset  Back

INTELLIGENT PRODUCT REQUIREMENT CONFIGURATOR

BACKGROUND

Enterprise solution tools intended to abide by government regulations, or other strict operating rules, may be tasked with setting up, or updating, their configuration settings to account for changes to the government regulations, operating rules, technology transformations, or moving platforms from legacy to new industry platforms. For such industries, the task of setting up, or updating, configuration settings for their enterprise solution tools can be a daunting task requiring many man hours of research and implementation. For example, banking is an industry where enterprise solution tools may require frequent changes to their configuration settings to account for an actively evolving landscape.

Accordingly, there is a need for improved automated tools to assist in recognizing changes within an industry, determining recommended configuration settings to address the changes, and generating a unique data set that allows a relevant enterprise solution tool to implement the recommended configuration settings.

DESCRIPTION OF THE FIGURES

FIG. 9 illustrates another exemplary graphical user interface generated by the iPROC tool.

FIG. 11 illustrates another exemplary graphical user interface generated by the iPROC tool.

FIG. 12 illustrates another exemplary graphical user interface generated by the iPROC tool.

FIG. 13 illustrates another exemplary graphical user interface generated by the iPROC tool.

DETAILED DESCRIPTION

Figure 1:
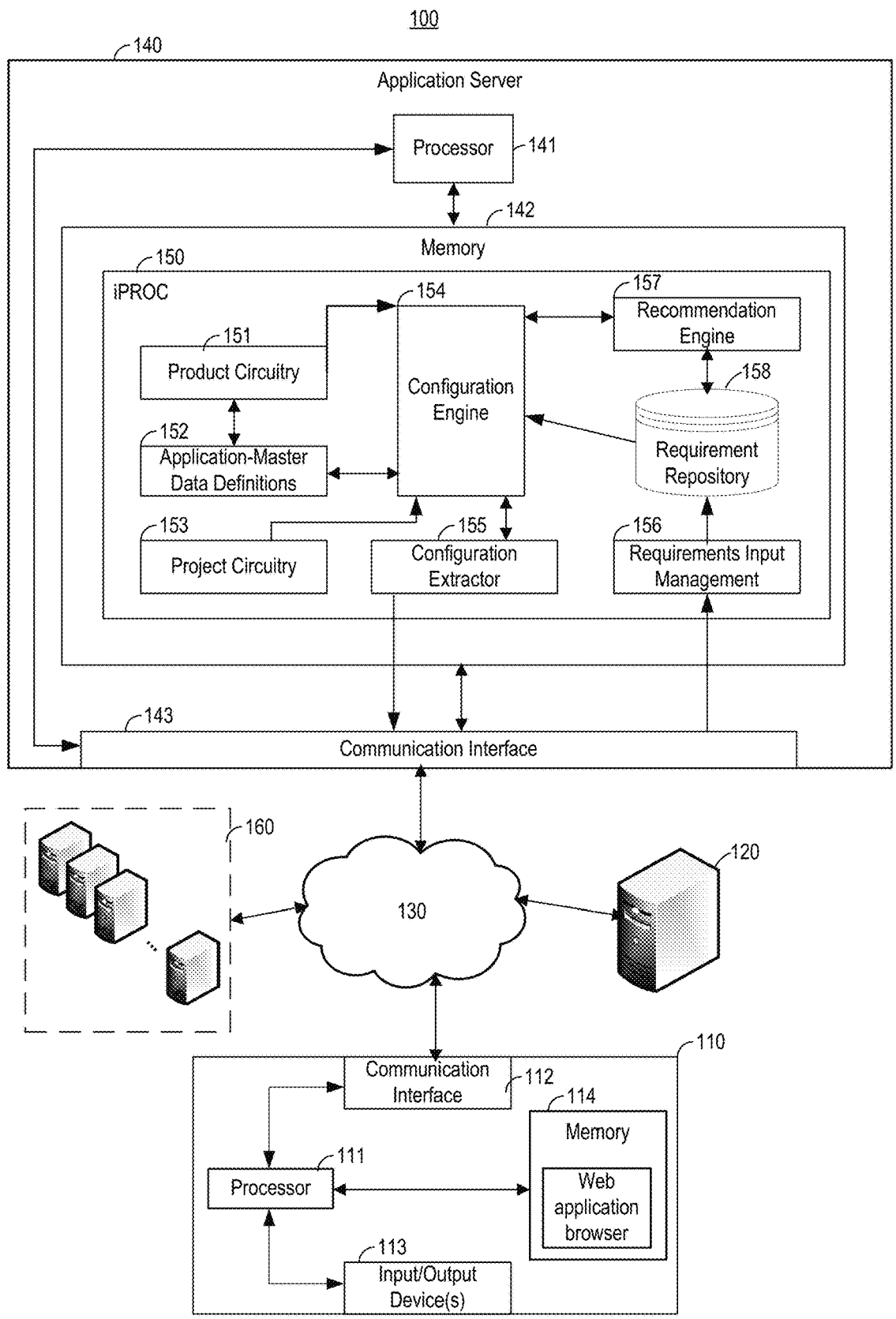
FIG. 1 illustrates an exemplary application platform system for implementing an intelligent product requirement configurator (iPROC) tool.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

The Intelligent Product Requirement Configurator (iPROC) is an enterprise solutions tool for assisting the initialization of configuration settings for certain complex application platforms such as, for example, banking application platforms (e.g., GPP, C2P, Flexcube, Dovetail, or the like). Relevant application platforms may include the option to input a large number configuration settings as part of the initialization process to provide a more accurate and usable output result. The configuration settings may, for example, describe government regulations or strict business rules that should be abided by when generating an output result of the application platform. For exemplary purposes, this disclosure will refer to a banking application platform as the platform upon which the iPROC tool will be implemented. However, the iPROC tool is also applicable on other application platforms that perform enterprise solution tasks across different industries where an initialization process includes the configuration of application platform settings based on a set of requirements and/or rules.

Reference will be made to requirements, where requirements determine the way in which an application platform is configured in order to fulfill related government regulations, market requirements, and/or related business requirements. The iPROC tool facilitates the building of static data (profiles) and business rules within the application platform that form the building blocks for any platform configuration activity that are implemented by the features of the iPROC, such as the recommendation engine that will be described in more detail.

References will also be made to rules, where the business rules are created by the iPROC tool for implementation within the relevant application platform. The business rules are created along with applicable profiles (e.g., static data) to help ensure the configuration settings on the application platform will allow the application platform to abide by the relevant requirements.

The iPROC tool may further serve as a repository for receiving and storing a list of pertinent requirements. For example, the iPROC tool may serve as a repository for receiving and storing a list of banking regulations, banking business requirements, and/or banking market requirements. By having access to such requirements, the iPROC tool may then analyze the requirements to generate a recommendation of configuration settings for implementing on the respective banking application platform. The generated recommendation may take the form of configuration data formatted to be readable and executed by the respective banking application platform to successfully implement the recommended configuration settings. It follows that another feature of the iPROC tool is to detect the respective application platform for which the iPROC tool has been called to generate the recommended configuration settings, and generate a directed configuration data specifically formatted to be readable and executable by the respective application platform.

According to some embodiments, the iPROC tool receives requirements information related to a particular application platform, receives data definition information describing attributes of the application platform, understands the changes to configuration settings of the application platform needed to abide by the rules and/or requirements, and generates a smart recommendation identifying configuration settings of the application platform that are recommended for modification in view of the rules and/or requirements. The application platform may be an application programmed to achieve one or more enterprise solution goals within a particular industry such as, for example, banking.

The recommendation generated by the iPROC tool may be accomplished by a cognitive recommendation engine. The recommendation engine is cognitive because the recommendation engine is built on neural networks that utilize deep learning techniques to assist in generating the configuration settings recommendations. By utilizing neural networks and deep learning techniques, the iPROC tool is able to evolve with each iteration, and therefore improve its ability to generate recommendations for implementing the configuration settings.

FIG. 1 illustrates exemplary system architecture for an application platform system 100 that includes component devices for implementing the described features of the iPROC tool 150. Application platform system 100 includes an application server 140 configured to include the hardware, software, middleware, and/or circuitry for operating the iPROC tool 150. Application server 140 is shown to include a processor 141, a memory 142, and a communication interface 143.

The iPROC tool 150 may include multiple different components for achieving the features described herein. For example, the iPROC tool 150 is shown to include product circuitry 151, application-master data definitions 152, project circuitry 153, configuration engine 154, configuration extractor 155, requirements input management 156, recommendation engine 157, and requirement repository 158. A more detailed description of the components that comprise the iPROC tool 150 is provided with reference to FIG. 3.

Application platform system 100 further includes a requirements server 120 configured to store requirements that correspond to specifically industries, markets, and by association, to specific application platforms that service the identified industry. For example, the requirements may correspond to the banking industry, and by association, the requirements may be applied to specific banking industry application platforms. According to some embodiments, the requirements may further specific a specific market (e.g., United States), such that banking requirements within the specific market are addressed. Within the banking industry example, the rules may include standard banking industry market practices and/or governmental banking regulatory requirements (e.g., payment scheme requirements). The requirements server 120 may communicate with the application server 140 that stores and runs the iPROC tool 150, through a network 130.

One of the objectives of the application platform may be to initiate configuration settings that allow the application platform to abide by the associated requirements stored on the requirements server 120. It follows that the iPROC tool 150 is implemented to generate a configuration data set that includes recommended configuration settings for the application platform that will allow the application platform to abide by the corresponding requirements relevant to the application platform. The requirements may be uploaded to the requirements server 120 by a communication device 110, or another data source such as a regulations server operating to provide up-to-date regulatory requirements for corresponding industries.

The requirements server 120 may also receive, e.g., from the application platform or manual inputs from the communication device 110, pre-defined data definitions in the form of datasets and business requirements. Data definitions define the data elements in a configuration settings screen (i.e., a profile screen) of the application platform, such that the data definitions may be referenced by the iPROC tool to build static data (profile data) for use by the recommendation engine 157, as will be described in more detail herein. In particular, data definitions are loaded into the iPROC tool to simulate the application platform, whose configuration elements are being designed and built by the iPROC tool.

For example, when the iPROC tool is tasked with generating recommended configuration settings for configuring accounts in a core banking platform such as Oracle-Flexcube, data definitions of accounts profiles in Oracle-Flexcube may be loaded into the iPROC tool, so that the iPROC tool can facilitate creation of the required accounts profiles in the iPROC tool. The accounts profiles created by the iPROC tool may later exported and loaded into Oracle-Flexcube, without having to be recreated in Oracle-Flexcube from scratch. The data definition is application platform specific and is provided to the iPROC tool by the specific application platform under request by the iPROC tool or implementation by the application platform. In this way, the data definition is required by the iPROC tool in order to simulate the configuration screens of the application platform and facilitate building the configuration elements in the iPROC tool (e.g., static data/profiles and business rules).

The business requirements may be user-specified requirements associated to a specific application platform. It follows that the datasets and business requirements may be collectively referred to as the data definitions or data definition rules throughout this disclosure.

The application platform system 100 communicates with any number and type of communication devices 110, where communication device 110 may include well known computing systems, environments, and/or configurations that may be suitable for implementing features of the iPROC tool 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. FIG. 1 shows that the communication device 110 includes a processor 111, a memory 114 configured to store the instructions for operating a web application browser, an input/output devices 113, and a communication interface 112. A user operating the communication device 110 may run the web application browser to access the iPROC tool 150 running on the application server 140. In addition or alternatively, the iPROC tool 150 and corresponding data for operating the iPROC tool 150 may be installed on a user's computing device (e.g., communication device 110) to run locally when a network connection to network 130 is not available. The communication device 110 may communicate with the application server 140 that stores and runs the iPROC tool 150, through a network 130.

The communication device 110 may further be representative of a communication device for running the application platform that will receive the configuration data set generated by the iPROC tool 150 described herein.

iPROC tool 150 may be a representation of software, hardware, circuitry, and/or middleware configured to implement features of the iPROC tool 150 described herein. For example, the iPROC tool 150 may be a web-based application operating, for example, according to a .NET framework within the application platform system 100.

Advantageously, the iPROC tool 150 may further be product agnostic so that the iPROC tool 150 may be utilized across multiple different application platforms (i.e., products). The iPROC tool 150 may achieve its product agnostic capability by allowing for dynamic data definition upload/input for each instance of implementing the iPROC tool 150 for a different application platform. This way, application platform specific data definitions may be uploaded/input for each unique implementation of the iPROC tool 150 for a unique application platform. The iPROC tool 150 may further achieve its product agnostic capability by including an elastic graphical user interface (GUI) that is dynamically generated based on the current set of data definitions that have been uploaded/input for the current implementation of the iPROC tool 150. When the iPROC tool is currently implemented for a particular application platform, the elastic GUI further operates to allow the user to be aware of data definitions that have previously been uploaded/input for other implementations of the iPROC tool 150 related to other application platforms.

Referring back to the application platform system 100 shown in FIG. 1, the application platform system 100 may further include a neural network 160 of communication devices. In particular, the communication devices included in the neural network 160 may be server type computer devices. The iPROC tool 150 may communicate with the neural network 160 to request an analysis that compares the data definitions to the requirements to generate a recommended set of configuration settings. For example, the recommendation engine 157 may rely, at least in part, on the neural network 160 to compare the data definitions to the requirements to generate a recommended set of configuration settings. The neural network 160 may communicate with the application server 140 that stores and runs the iPROC tool 150, through a network 130.

Figure 2:
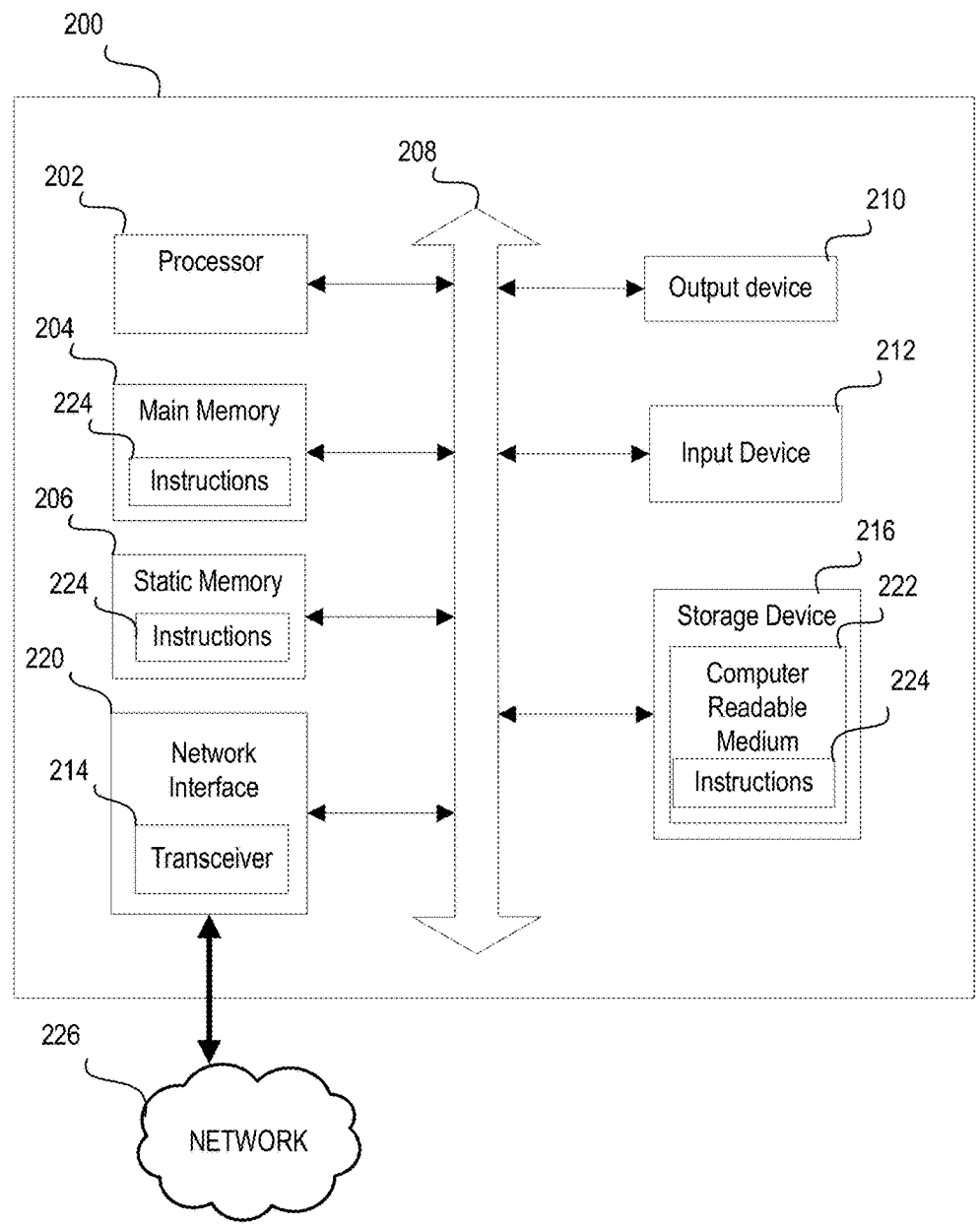
FIG. 2 illustrates a block diagram of an exemplary computer architecture for a computer device in the exemplary application platform system illustrated in FIG. 1.

Each of the communication device 110, the requirements server 120, the neural network 160, and the application server 140 may include one or more components of computer system 200 illustrated in FIG. 2.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an embodiment, network 226 may support wireless communications. In another embodiment, network 226 may support hard-wired communications, such as a telephone line or cable. In another embodiment, network 226 may support the Ethernet IEEE (Institute of Electrical and Electronics Engineers) 802.3x specification. In another embodiment, network 226 may be the Internet and may support IP (Internet Protocol). In another embodiment, network 226 may be a LAN or a WAN. In another embodiment, network 226 may be a hotspot service provider network. In another embodiment, network 226 may be an intranet. In another embodiment, network 226 may be a GPRS (General Packet Radio Service) network. In another embodiment, network 226 may be any appropriate cellular data network or cell-based radio network technology. In another embodiment, network 226 may be an IEEE 802.11 wireless network. In still another embodiment, network 226 may be any suitable communication network or combination of communication networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 216. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the iPROC tool 150. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the iPROC tool 150.

Although computer system 200 is represented in FIG. 2 as a single processor 202 and a single bus 208, the disclosed embodiments applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the iPROC tool 150.

Storage device 216 may include a controller (not shown) and a computer readable medium 222 having instructions 224 capable of being executed by processor 202 to carry out functions of the iPROC tool 150. In another embodiment, some or all of the functions are carried out via hardware in lieu of a processor-based system. In one embodiment, the controller included in storage device 216 is a web application browser, but in other embodiments the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly in some embodiments, output device 210 displays a user interface. In other embodiments, output device 210 may be a speaker configured to output audible information to the user. In still other embodiments, any combination of output devices may be represented by the output device 210.

Network interface 220 provides the computer system 200 with connectivity to the network 226 through any compatible communications protocol. Network interface 220 may be representative of the communication interface 143 included with the application server 140 shown in FIG. 1. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources. Network interface 220 may further be representative of separate network interface card hardware components dedicated to communicating with different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 3:
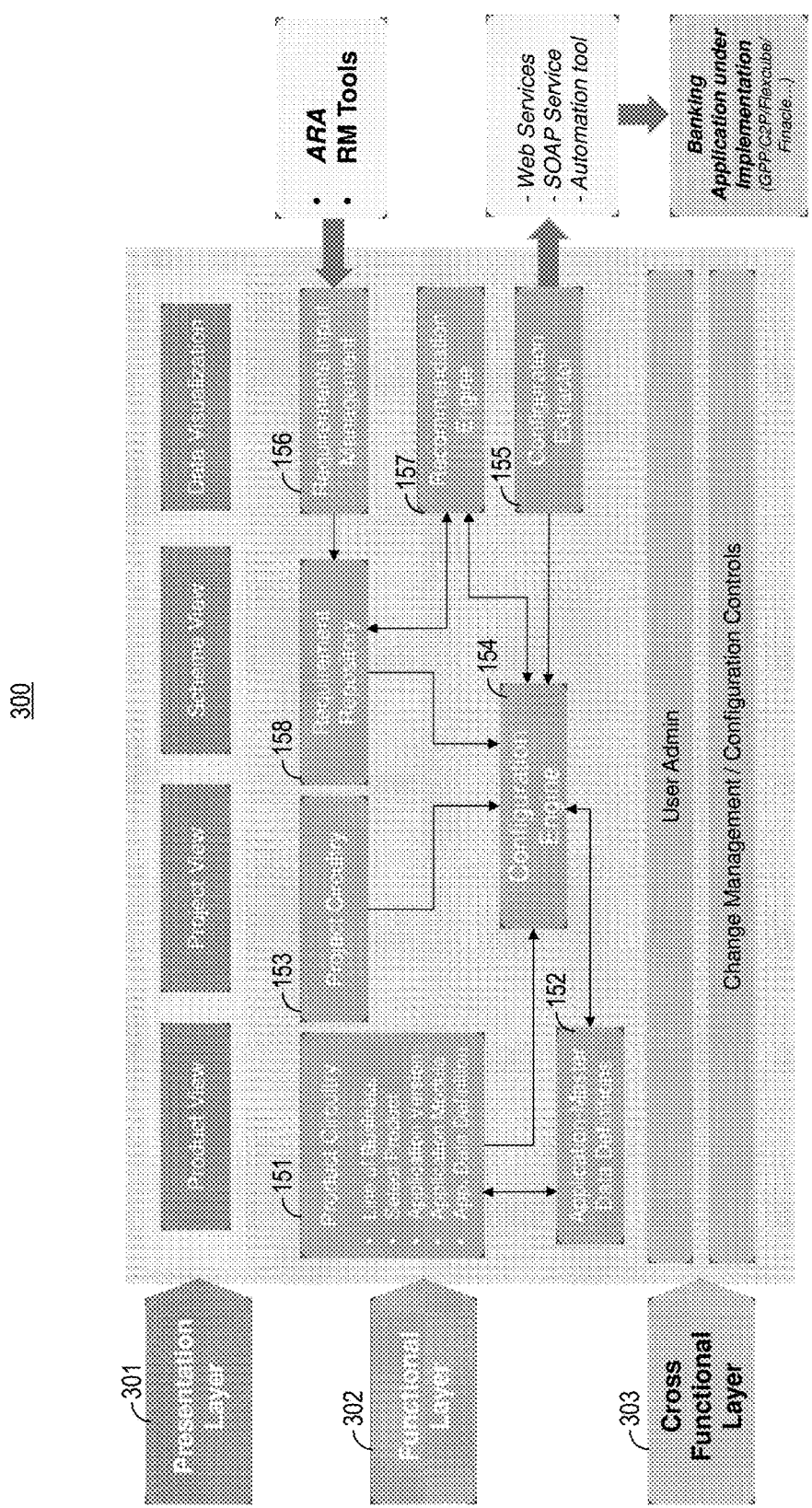
FIG. 3 illustrates an exemplary system block diagram for the iPROC tool.

FIG. 3 illustrates a system block diagram 300 providing a visual representation of the iPROC tool 150. As illustrated by the system block diagram 300, the iPROC tool 150 may include a presentation layer 301, a circuitry layer 302, and a cross functional layer 303. The representation of the iPROC tool 150 shown in FIG. 1 includes the circuitry layer 302, while not expressly illustrating the presentation layer 301 and the cross functional layer 303.

The presentation layer 301 includes visual components and features of the iPROC tool 150. The visual components of the presentation layer 301 may include various graphical user interfaces (GUIs) that present various views (e.g., product view, project view, scheme view) of the iPROC tool 150, as well as data visualizations generated by the iPROC tool 150. Under the umbrella of the implementation dashboard, the presentation layer 301 may include implementation circuitry for a user to select the application platform for which the iPROC tool 150 will be generating the configuration data set that includes the recommended configuration settings for the selected application platform. The presentation layer may also include a GUI for the user to define and/or upload a set of data definitions pertaining to the selected application platform. The presentation layer may further include a GUI for the user to define and/or upload a set of business requirement rules for applying to the selected application.

Figure 6:
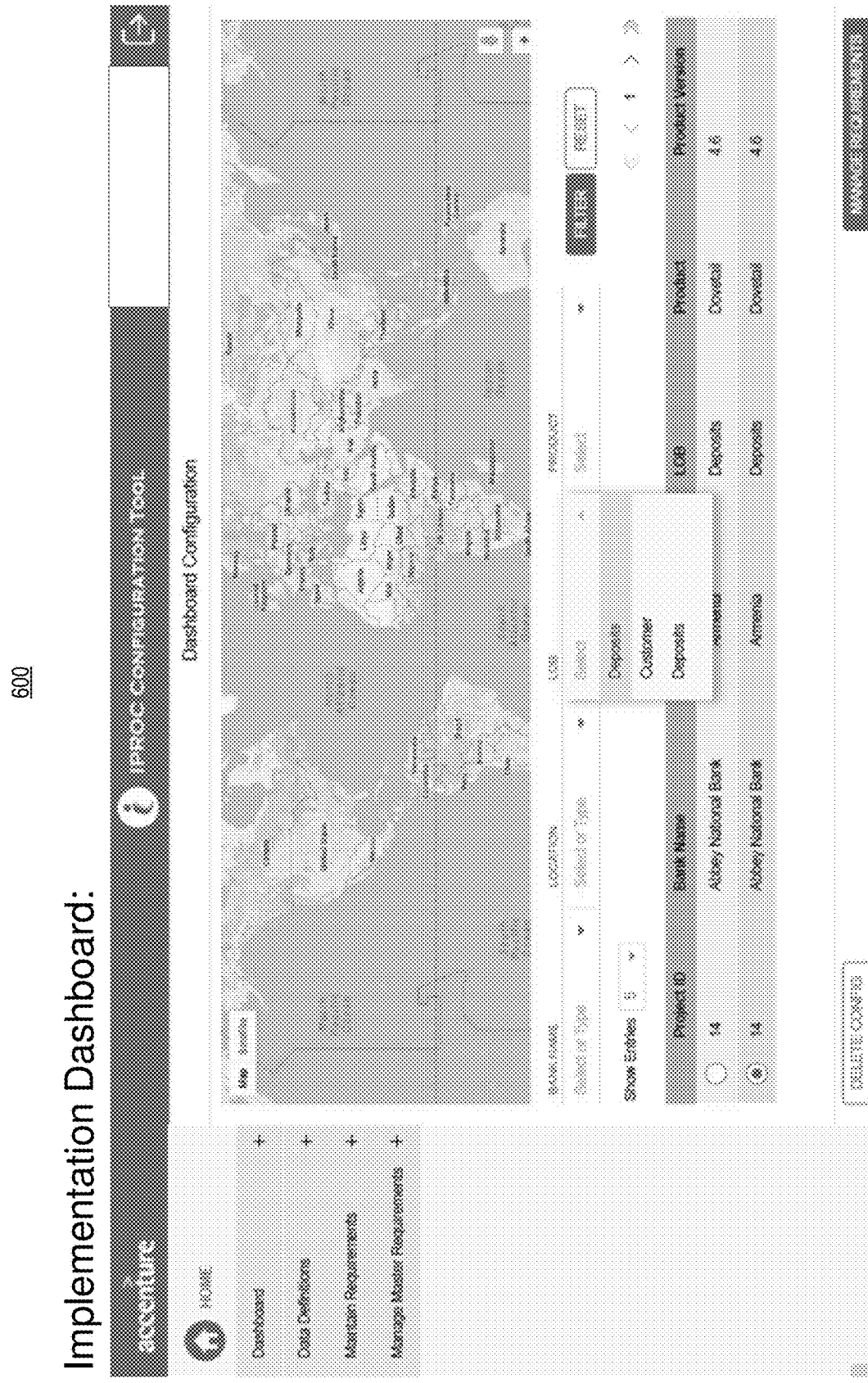
FIG. 6 illustrates an exemplary graphical user interface generated by the iPROC tool.

For example, the presentation layer 301 may include an implementation dashboard that presents a high-level menu of operational features available on the iPROC tool 150. FIG. 6 illustrates an exemplary implementation dashboard GUI 600 generated by the iPROC tool 150 for application platforms associated with the banking industry. The implementation dashboard GUI 600 is shown to include project selection filtering options such as an option for selecting a bank name, an option for selecting a bank location, an option for selecting a line of business (LOB), and an option for selecting a specific application platform product (i.e., product, or application platform). Each project may represent a previous implementation of the iPROC tool 150 that resulted in a configuration data set being generated. It follows that a user may select from the various filtering options on the implementation dashboard GUI 600 to search, select, and open stored iPROC tool projects that represent previous implementations of the iPROC tool 150 that generated specific configuration data sets based on specifically referenced input data (e.g., rules and/or other application platform configuration settings). For example, implementation dashboard GUI 600 displays project identification (ID) 14 identifies an implementation of the iPROC tool 150 that was implemented for Abbey National Bank, located in Armenia, for a deposits LOB, using the Dovetail application platform, version 4.6 of the Dovetail application platform. Project circuitry 153 may be responsible for generating the implementation dashboard GUI 600, receiving the project related filtering information through the implementation dashboard GUI 600, identifying previously implemented projects by the iPROC tool 150 based on the project related filtering information, and modifying the implementation dashboard GUI 600 to display the identified projects that have been filtered based on the project related filtering information.

Figure 7:
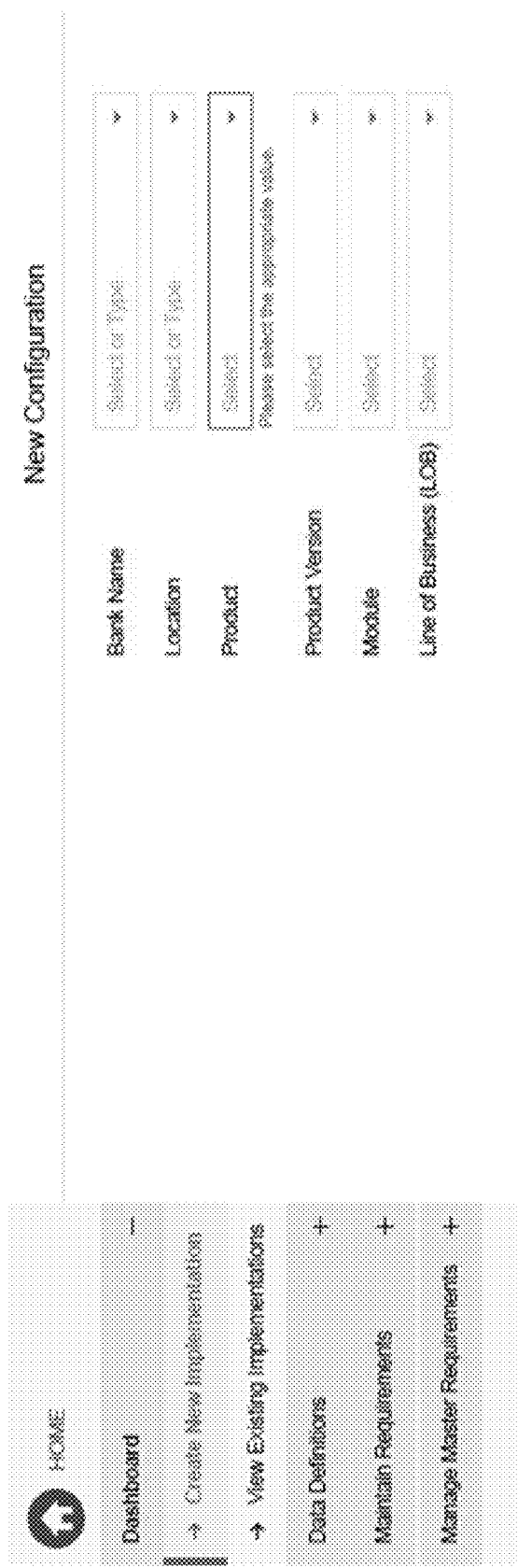
FIG. 7 illustrates another exemplary graphical user interface generated by the iPROC tool.

FIG. 7 illustrates an exemplary create new implementation GUI 700 for a user to input specific profile attributes to create a new project. For example, the create new implementation GUI 700 is shown to include attribute input options such as an option for inputting a bank name, an option for inputting a bank location, an option for inputting a specific application platform product (i.e., product, or application platform), an option for inputting a product version, an option for inputting a specific module and an option for inputting a line of business (LOB). A module may be a sub component catering to a particular of line of business or payment scheme. For example, Deposits, Trade finance, and Loans are modules within the Core Banking application platform in Flexcube. Likewise, payment schemes like SEPA-CT, SEPA-DD, Target2, and CHAPS, are modules within the payment application platform GPP. With this information, a new implementation profile may be created and assigned a project ID number. The product circuitry 151 of the iPROC tool 150 may be responsible for generating the create new implementation GUI 700, and gathering the product related information from the inputs to the create new implementation GUI 700.

Figure 8:
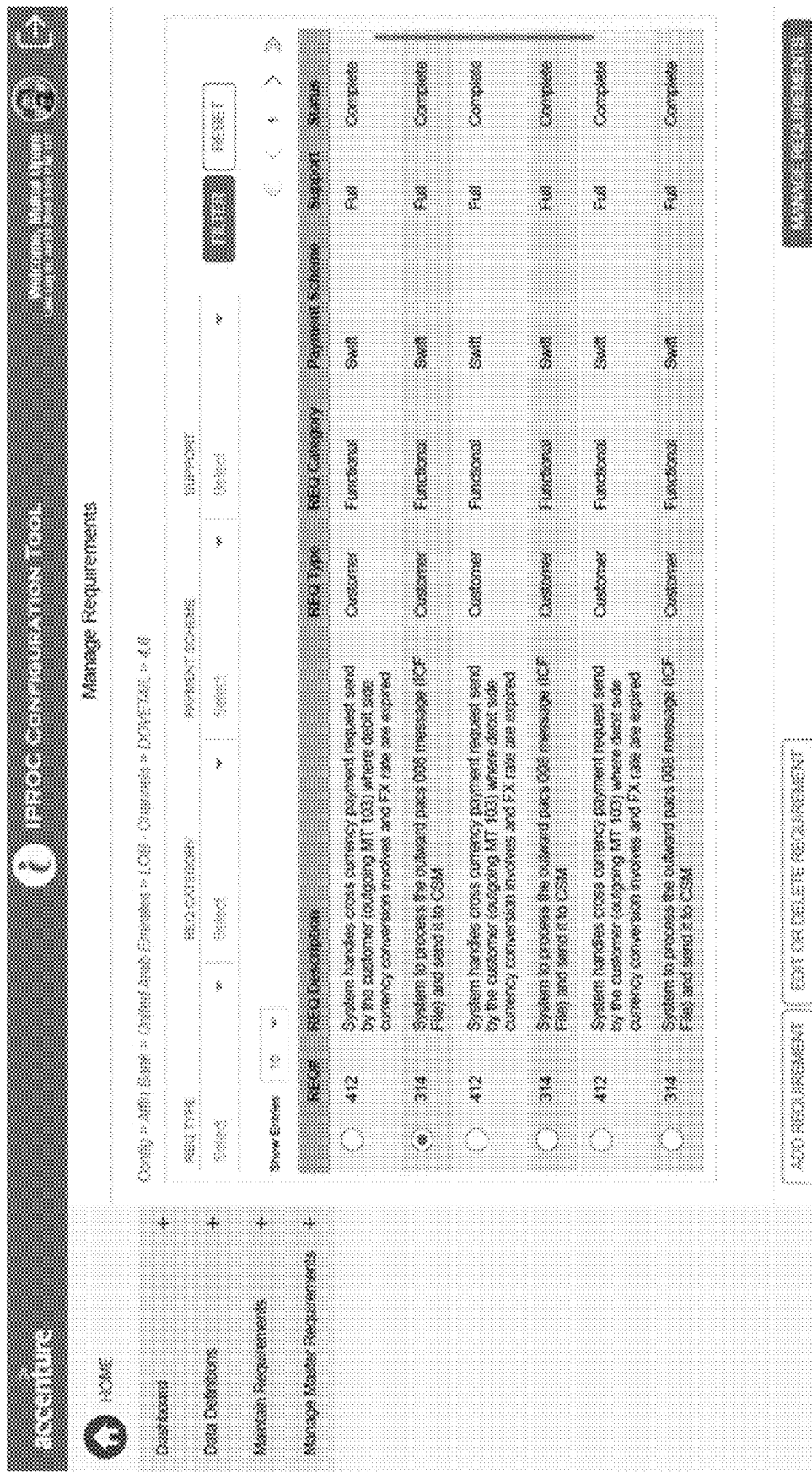
FIG. 8 illustrates another exemplary graphical user interface generated by the iPROC tool.

FIG. 8 illustrates an exemplary manage requirements GUI 800 for a user to manage business requirement rules that have previously been input and/or uploaded to the iPROC tool 150. The exemplary manage requirements GUI 800 includes requirements filtering options for filtering through the existing business requirement rules known to the iPROC tool 150. The existing business requirement rules known to the iPROC tool 150 may be stored on, and retrieved from, the requirement repository 158. The requirements filtering options may include an option for inputting a requirement type, an option for inputting a requirement category, an option for inputting a payment scheme, and an option for inputting a support type. Based on the received inputs for the requirements filtering options, a list of potential business requirement rules may be selected and displayed on the manage requirements GUI 800. The requirements input management 156 of the iPROC tool 150 may be responsible for generating the manage requirements GUI 800, receiving the requirements filtering options, identifying known business requirement rules based on the received requirements filtering options, and modifying the display of the manage requirements GUI 800 to include the identified business requirement rules based on the received requirements filtering options.

FIG. 9 illustrates an exemplary add new requirements GUI 900 for a user to input new business requirement rules. For example, the new requirements GUI 900 is shown to include requirement attribute options such as an option for inputting a payment scheme for a new business requirement rule, an option for inputting a description for the new business requirement rule, an option for inputting a requirement type for the new business requirement rule, an option for inputting a requirement category for the new business requirement rule, and an option for inputting a requirement support type for new business requirement rule. With the requirement attributes information, a new business requirement rule may be created and uploaded to the requirement repository 158 to be referenced by the iPROC tool 150. The requirements input management 156 of the iPROC tool 150 may be responsible for generating the new requirements GUI 900, receiving the requirements attributes information, creating a new business requirement rule based on the received requirements attributes information, and uploading the new business requirement rule to the requirement repository 158.

Figure 10:
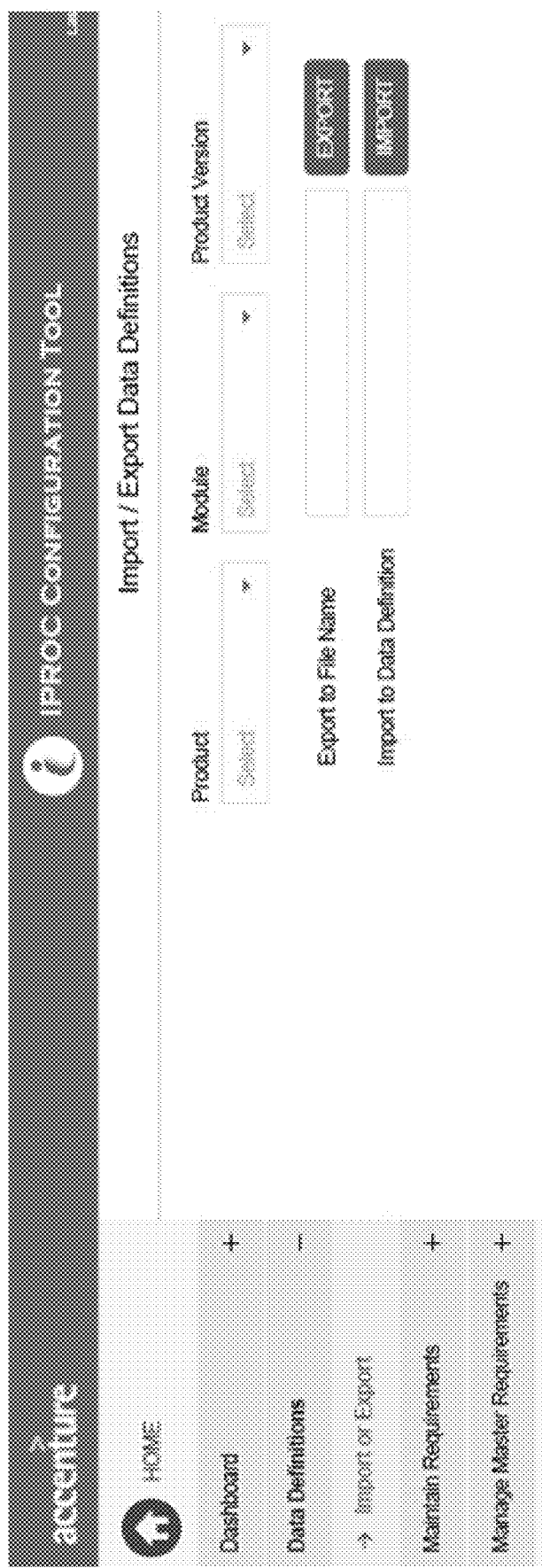
FIG. 10 illustrates another exemplary graphical user interface generated by the iPROC tool.

FIG. 10 illustrates an exemplary upload data definitions GUI 1000 for a user to upload data definitions for identifying and operating an application platform. For example, the upload data definitions GUI 1000 includes product attribute options such as an option for inputting the product name, an option for inputting a product module, and an option for inputting a product version information. The upload data definitions GUI 1000 further includes an option for exporting an existing data definitions set to a selected export file location, or importing a data definitions set from an import file location. The application-master data definitions 152 of the iPROC tool 150 may be responsible for receiving the product attribute information, and exporting or importing selected data definition sets.

FIG. 11 illustrates an exemplary manage profile GUI 1100. The manage profile GUI 1100 may include a list of existing profiles from previous implementations of the iPROC tool 150 across different variables (e.g., requirements and/or data definitions), as well as different products (i.e., application platforms). Each profile may be represented by a profile ID and profile name. By selecting a profile from the list displayed on the manage profile GUI 1100, the user may be provided with a visual description describing details of the profile attributes. The configuration engine 154 may be generally responsible for operating the manage profile GUI 1100.

Figure 12:
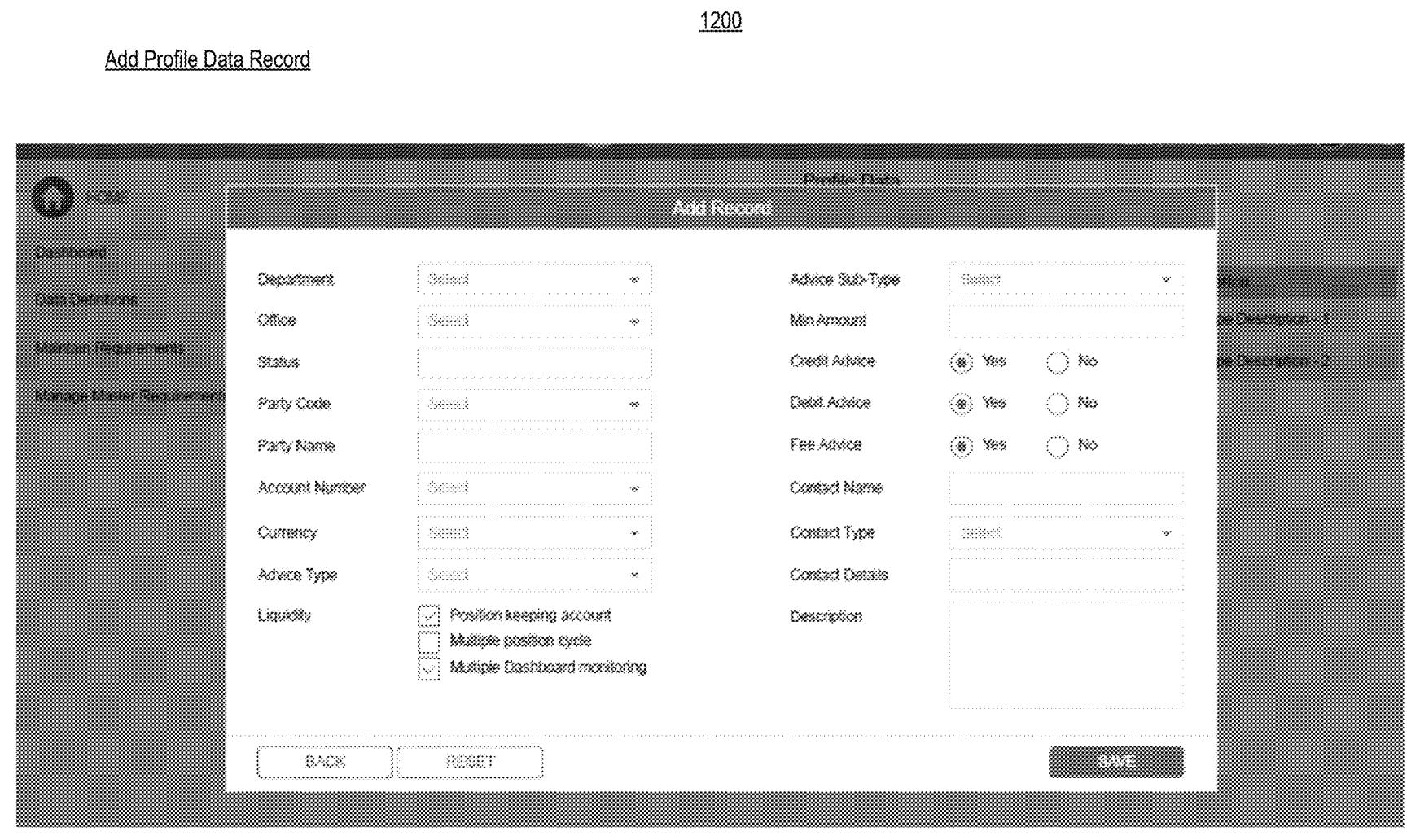

FIG. 12 illustrates an exemplary add profile data record GUI 1200 for a user to input a new profile data record. The profile data record GUI 1200 includes a variety of options for inputting profile attributes related to the product for which the new profile data record is being created for. For example, the profile attribute input options may include one or more of a department input option, an office input option, a status input option, a party code input option, a party name input option, an account number input option, a currency input option, an advice type input option, a liquidity input option, an advice sub-type input option, a minimum amount input option, a credit advice input option, a debit advice input option, a fee advice input option, a contact name input option, a contact type input option, a contact details input option, and a general description input option. The configuration engine 154 may be generally responsible for operating the add profile data record GUI 1200.

Figure 13:
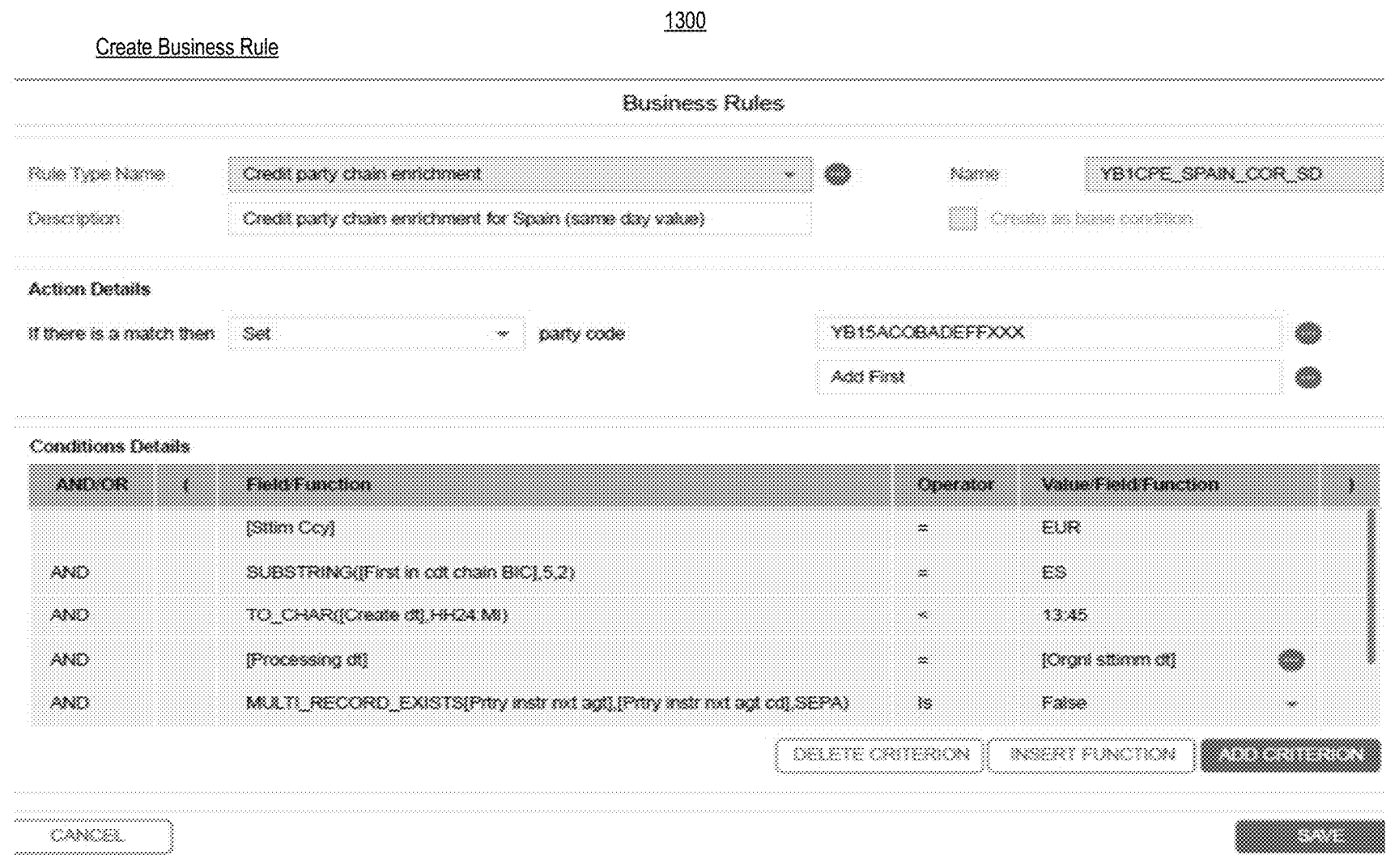

FIG. 13 illustrates an exemplary create business rule GUI 1300 for a user to create a new business requirement rule for storage on the requirement repository 158. The create business rule GUI 1300 may include various rule creation options including a rule name input option, a rule description input option, and various rule condition details input options for creating the new business requirement rule. The requirements input management 156 may be responsible for generating the create business rule GUI 1300, and operating the create business rule GUI 1300 to create the new business requirement rule for storage on the requirement repository 158.

Referring back to the system block diagram 300, the circuitry layer 302 of the iPROC tool 150 includes those components operating to generate the configuration data set that describes recommended configuration settings for a particular application platform. In particular, the product circuitry 151 is configured to receive program attributes that define the particular application platform, including, for example, a line of business (LOB) attribute, a product (i.e., application platform) name attribute, an application platform version attribute, an application module attribute, and an application data definition attribute for the particular application platform.

The project circuitry 153 may be configured to search for existing projects from previous implementations of the iPROC tool 150, as described with reference to the implementation dashboard GUI 600 shown in FIG. 6. The project circuitry 153 may further be configured to create new projects, as described with reference to the create new implementation GUI 700 shown in FIG. 7.

The requirements input management 156 may receive requirements information from an ARA (Accenture's requirements Management Tool) or other RM tools (Market leading Requirements Management Tools ex. IBM Rational). The requirements received by the requirements input management 156 may be stored on the requirement repository 158. The application-master data definitions may receive and store data definitions extracted from the product attribute information obtained by the product circuitry 151. The application-master data definitions may also receive data definitions directly from a user input from the communication device 110. For example, the data definitions may be received from user inputs during the creation of a new project or product definition.

The configuration engine 154 may be configured to map the requirements against the data definitions, and transmit the mapping results to the recommendation engine 157. The recommendation engine 157 receives the mapping results and communicates with the neural network 160 (as shown in FIG. 1) to develop recommended configuration settings for a particular application platform to achieve the requirements while also operating within the rules described by the data definitions. The configuration extractor 155 receives the recommendation developed by the recommendation engine 157, and generates a configuration data set. The configuration data set is a data file that is formatted to be readable and executable by the particular application platform for which it describes recommended configuration settings for. The configuration extractor 155 is further configured to transmit the configuration data set to the communication device running the particular application platform. The configuration extractor 155 may transmit the configuration data set to the communication device running the particular application platform through, for example, one or more of various web services, simple object access protocol (SOAP) services, and/or automation tools.

Referring back to the system block diagram 300, the iPROC tool 150 further includes a cross functional layer 303. The cross functional layer 303 includes components of the iPROC tool 150 for controlling administrative features such as configuration settings of the iPROC tool 150, security settings for the iPROC tool 150, access and entitlement management controls to the iPROC tool 150, iPROC tool 150 version release management, and the like.

Figure 4:
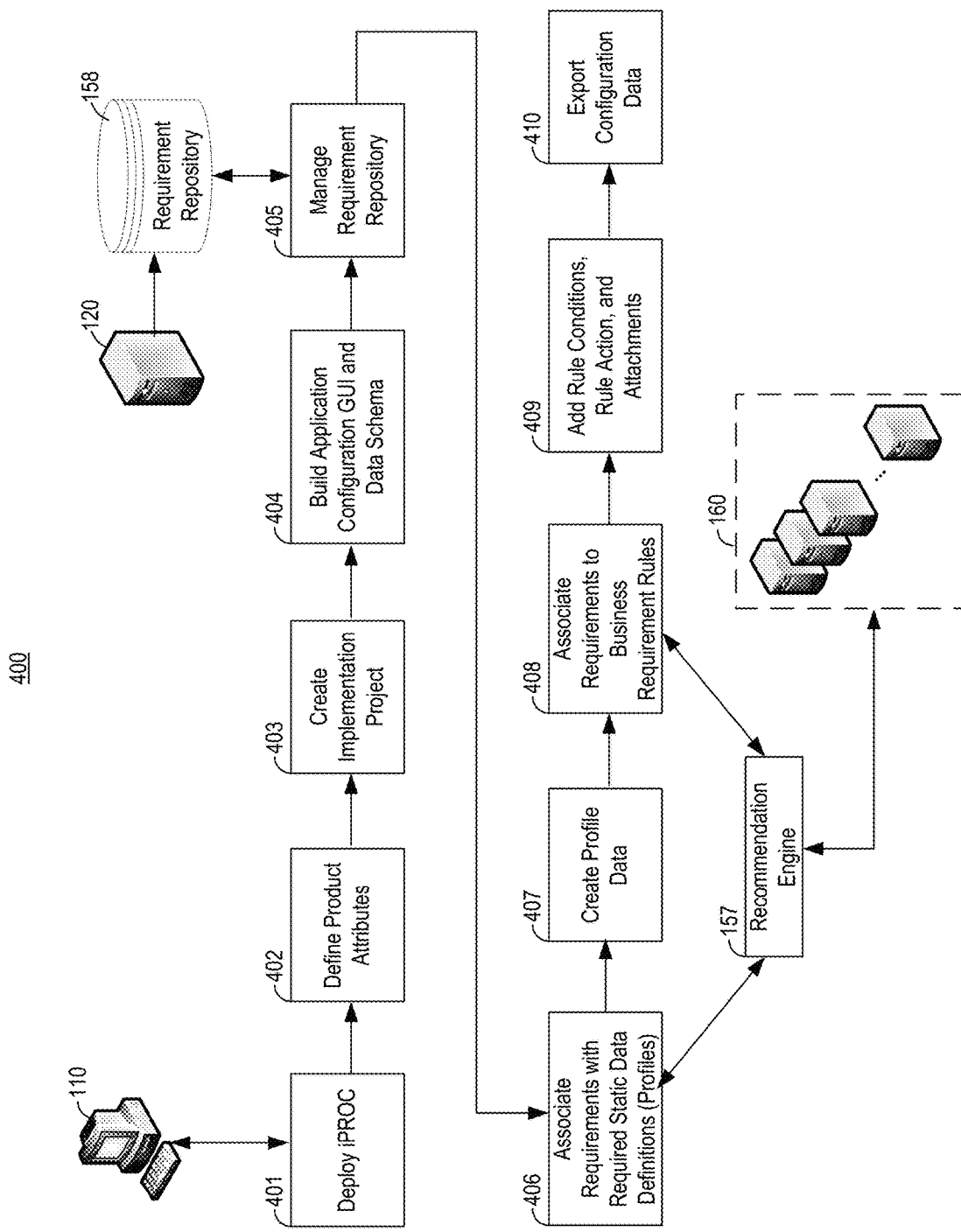
FIG. 4 illustrates an exemplary flow diagram of logic for an operation of the iPROC tool.

FIG. 4 illustrates an exemplary flow diagram 400 of logic describing an operational process implemented by the iPROC tool 150. The flow diagram 400 describes, for example, the logic utilized by the iPROC tool 150 as provided in the application platform system 100 shown in FIG. 1.

The iPROC tool 150 may initially be deployed by a deployment command from the communication device (401). The iPROC tool 150 may be stored and executed on the application server 140 as shown in FIG. 1. In addition or alternatively, the iPROC tool 150 may be stored and executed, at least in part, on the communication device 110.

Following the deployment of the iPROC tool 150, an application platform (i.e., product) may be identified for the iPROC tool 150 to generate a configuration data set including recommended configuration settings for the identified application platform. The application platform may be identified by defining product attributes of the application platform (402). The product attributes may, for example, be data definitions for the identified application platform. In addition or alternatively, the product attributes may be defined by inputting attribute information for a new project through the create new implementation GUI 700 shown in FIG. 7.

The iPROC tool 150 may create a new implementation project based on the defined product attributes (403). The new implementation project may be associated with the identified application platform.

The iPROC tool 150 may build an application configuration GUI and data schema according to the new project (404). The data schema may include the predefined datasets, data models, data definitions, and/or data dictionary pertaining to the identified application platform (ex. GPP/C2P/ Dovetale/Flexcube) under implementation at a Bank, that is currently being configured by the iPROC tool. The application configuration GUI being built by the iPROC tool may be built to simulate the configuration screen of the identified application platform based on the collectively gathered data schema information. As described previously, the application configuration GUI may be an elastic GUI configured to dynamically adapt to the particular application platform for which the iPROC tool is currently being implemented for.

The iPROC tool 150 may manage the requirement repository 158, as described herein (405). For example, requirements may be received by the requirement repository 158 from the requirements server 120.

The iPROC tool 150 may proceed to map the requirements against the data definitions in two parts. First, the iPROC tool 150 may associate the requirements with the required static data definitions that comprise the data definitions (406). By doing so, the iPROC tool 150 creates a new configuration including profile data representative of the configuration settings that may be input into a configuration settings screen of the identified application platform (407). A profile includes a group of data elements that represents and defines configuration settings in the identified application platform. Each group of settings defines one object or entity which is used to build relationships between items/ entities in the identified platform. For example, Accounts, Customers, Method of payment, Currency, and Fees, are all profiles in the Global PAYplus (GPP) application platform.

Second, the iPROC tool 150 associates the requirements to the business requirement rules that comprise the data definitions (408). Both association processes may be implemented by the recommendation engine 157 working in communication with the neural network 160.

Figure 5:
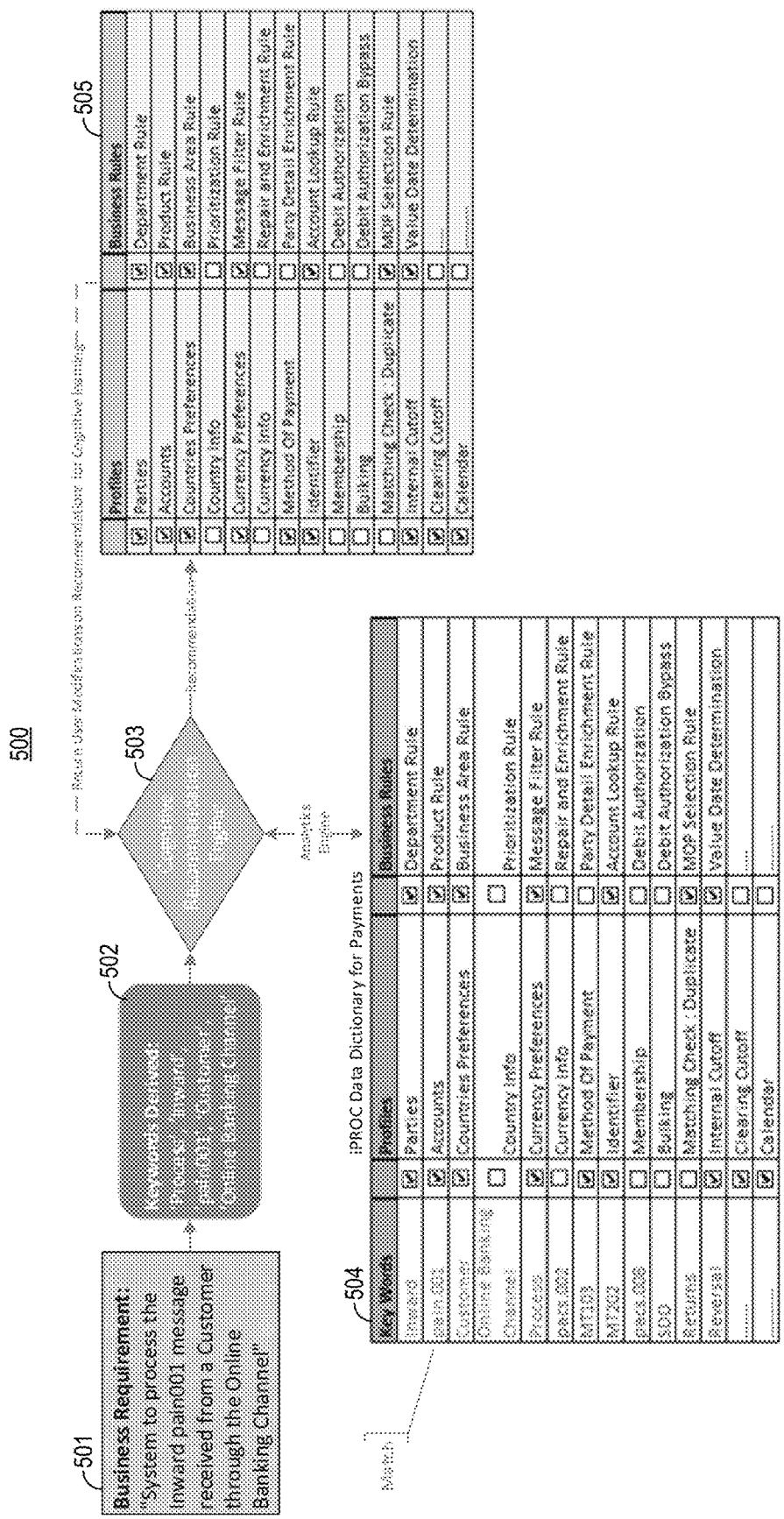
FIG. 5 illustrates an exemplary flow diagram of logic for an operation of a recommendation engine included in the iPROC tool.

FIG. 5 illustrates an exemplary flow diagram 500 of logic implemented by the recommendation engine 157.

A business requirement rule may include an alphanumeric message such as, for example, the business requirement rule message shown in the flow diagram 500 that reads "System to process the inward pain001 message received from a customer through the online banking channel." The recommendation engine 157 may read the business requirement rule message (501).

From the business requirement rule message, the recommendation engine 157 may derive one or more keywords. For example, the recommendation engine 157 may derive the following keywords from the business requirement rule message shown in the flow diagram 500: "Process", "inward", "pain001", "Customer", "online banking channel".

The recommendation engine 157 may receive the derived keywords and initiate an analytics engine to perform a mapping of the derived keywords to a data dictionary (i.e., data definitions and requirements) (503).

The mapping process includes mapping the derived keywords against a list of keywords stored in the data dictionary (504). Here, the derived keywords are shown to have matching keywords in the data dictionary. Each of the data dictionary keyword entries have a corresponding profile entry and a corresponding business rule entry.

After mapping the derived keywords to the keywords listed in the data dictionary to find matching entries, the recommendation engine 157 develops a recommendation that includes the suggested profiles and business rules from the matching entries that the user needs to configure and build on the platform, in order to fulfill a particular business requirement (505). The developed recommendation may further be transmitted to the neural network 160 for further learning and/or analysis.

The neural network 160 is a programming paradigm which enables a computing device to learn from observational data and Deep Learning techniques. The neural network 160 may be organized into three main parts: an input layer, a hidden layer, and an output layer. The term deep learning is a reference to the neural network 160 including a plurality of hidden layers. These layers are referred to as being hidden because they are not visible as a network output.

Figure 14:
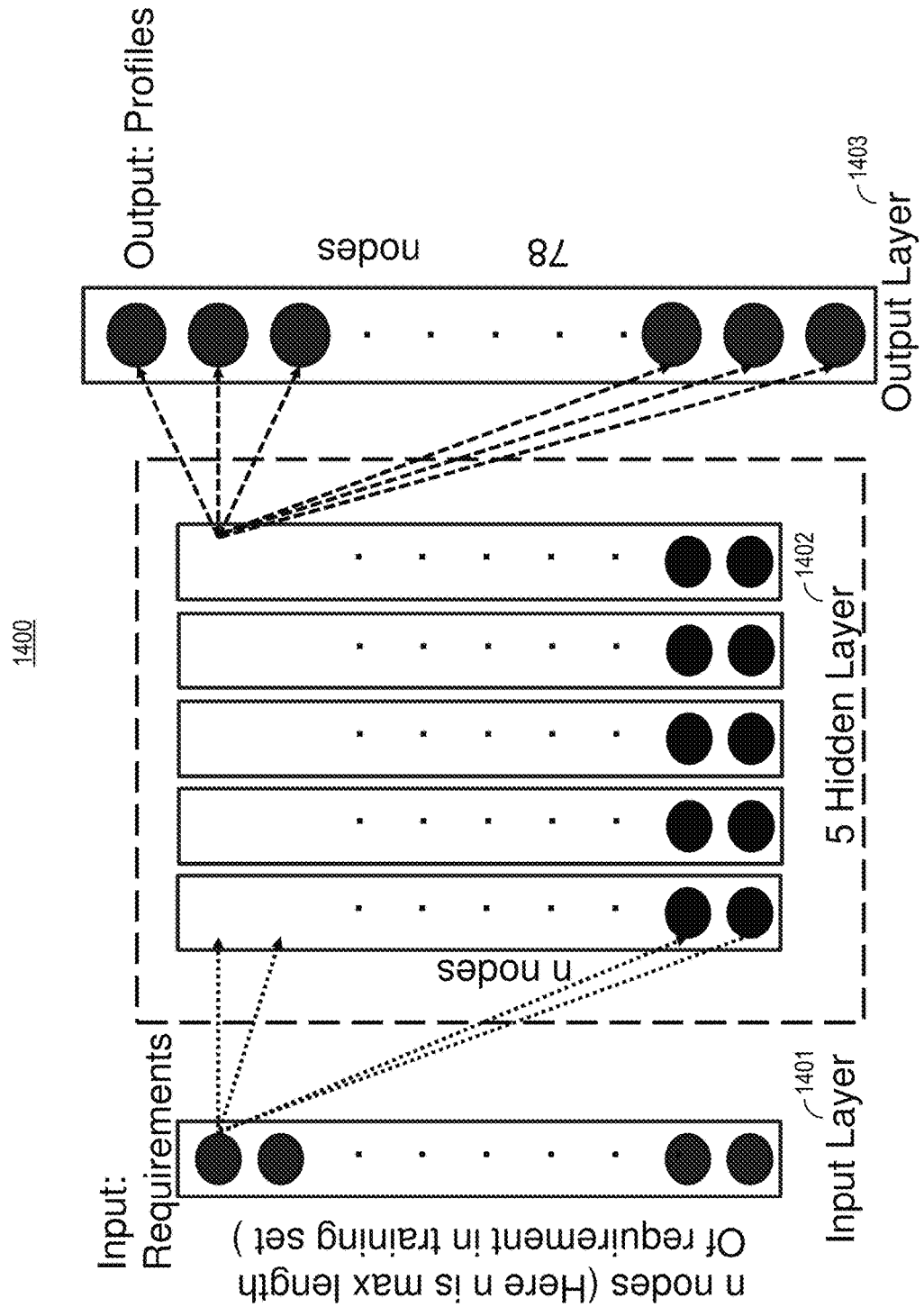
FIG. 14 illustrates a block diagram representative of a neural network.

FIG. 14 illustrates a block diagram 1400 representative of the neural network 160. The block diagram 1400 shows the neural network 160 to include an input layer 1401, five hidden layers 1402 (the hidden layers 1402 may be comprised of one or more layers), and an output layer 1403. The input layer 1401 consists of a set of nodes in which each node maps to a numeric representation of each word from the business requirement message field. The output layer 1403 consists of a set of nodes in which each node maps to the predicted value of the profile parameters. The hidden layer 1402 handles weights and biases which get optimized during iterations to achieve accurate prediction.

TensorFlow is an exemplary deep learning application programming interface (API) that implements a known deep learning technique. The TensorFlow API may which provide various utility to model the neural network 160. The TensorFlow API is invoked from a Python wrapper, where the following are key components of the Python wrapper:

corpes_handle.py is a python script containing utility methods which cater to the following functionalities: 1) Data Preprocessing: Applicable methods are: clean_str, pad_sentence, vocab creation; and 2) Load Data: Applicable method: load_data( ) for retrieving values of Requirement and vocabulary.

recommendation.py is a python script containing the following logical steps: 1) Declare key Hyperparameters(configurations) like: Number of Epoch/Iterations=100000, Number of Hidden Layers=5, Training Size=80% of data from input corpus (recommendation.xlsx), Validation Size=20% of data from input corpus (recommendation.xlsx); 2) Launch tensorflow session in which model is defined using ReLU function by declaring appropriate weights and biases; 3) Cost is calculated by taking the difference of actual and predicted values and it is optimized (using AdamOptimizer); 4) Accuracy is checked using validation data set (20% of input corpus); and 5) Created Neural Network Model is then saved to disk run_model.py is a python script containing the following logical steps: 1) Declare key Hyperparameters(configurations) in same way as defined in recommendation.py; 2) Create tensorflow graph and launch session in which model is defined using trained weight and bias; 3) Restore the saved model from recommendation.py; and 4) Model will predict the values for profile which will be wrapped in an object and returned back.

This way, the recommendation engine 157 exposes an interface and may be invoked via representational state transfer (REST) API based calls. The interface may include a REST URL, input parameters that include string objects, and output parameters that contain JavaScript Object Notation (JSON) objects that are returned from the service.

Referring back to the flow diagram 400 illustrated in FIG. 4, rule conditions, rule actions, and rule attachments may be added to the business rule being developed based on the analysis & recommendations from the recommendation engine 157 (409). This includes the development of recommended configuration settings.

The iPROC tool 150 may consider the developed recommendation and generate a configuration data set in a data file format that is compatible with the current application platform (410).

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system for initializing configuration settings of an application platform, the system comprising:
a communication interface configured to receive a set of requirements and a set of data definitions from a repository database, wherein the set of requirements and the set of data definitions are uploaded to the repository database by a requirements server, the set of data definitions comprising definitions of application platform specific data elements in a configuration settings screen of the application platform;

a memory configured to store a set of processor executable instructions;

a processor configured to communicate with the communication interface and the memory, and further configured to execute the processor executable instructions to:

receive, through the communication interface, the set of requirements and the set of data definitions;

generate a configuration profile based on the set of data definitions and historical configuration profiles previously generated for the application platform, the configuration profile simulating the configuration settings screen of the application platform;

derive applicable profiles based on the set of requirements and the configuration profile; and automatically generate, by a cognitive recommendation engine using a neural network and applying a deep learning technique, a recommended configuration data set based on the derived applicable profiles, wherein the recommended configuration data set is formatted in a data format that is compatible with the application platform by being at least both readable and executable on the application platform, the recommended configuration data set including configuration profile entries and business rules satisfying the set of requirements based on an analysis of the applicable profiles.

2. The system of claim 1, wherein the processor is further configured to execute the processor executable instructions to:

control the communication interface to communicate with the neural network, wherein the neural network is configured to determine the configuration profile entries and the business rules; and control the communication interface to receive the recommended configuration data set from the neural network.

3. The system of claim 2, wherein the recommended configuration data set includes recommended configuration settings for the application platform that satisfy the set of requirements.

4. The system of claim 1, wherein the set of requirements describe at least one of market requirements, business requirements, or regulatory requirements corresponding to the application platform.

5. The system of claim 1, wherein the repository database is associated with the application platform.

6. The system of claim 1, wherein the processor is further configured to execute the processor executable instructions to:

transmit the recommended configuration data set to a remote computing device running the application platform.

7. The system of claim 1, wherein the derivation of the applicable profiles is based on the set of requirements and inputs to the configuration profile via the simulated configuration settings screen.

8. The system of claim 1, wherein the set of data definitions comprise definitions of application platform specific data elements in the configuration settings screen of the application platform.

9. The system of claim 1, wherein the applicable profiles are derived from the inputs to the simulated configuration setting screen by mapping, with a configuration engine, the set of requirements against the set of data definitions to derive mapping results, and the recommended configuration data set is automatically generated based on the applicable profiles by the cognitive recommendation engine using the mapping results.

10. The system of claim 1, wherein the simulated configuration settings screen is dynamically generated based on the set of data definitions.

11. A system for initializing configuration settings of an application platform, the system comprising:

a communication interface configured to receive a set of requirements and a set of data definitions from a repository database, wherein the set of requirements and the set of data definitions are uploaded to the repository database by a requirements server; and the set of data definitions comprising definitions of application platform specific data elements in a configuration settings screen of the application platform;

a memory configured to store a set of processor executable instructions for implementing an intelligent product requirement configurator (iPROC) tool;

a processor configured to communicate with the communication interface and the memory, and the processor further configured to execute the processor executable instructions for implementing the iPROC tool to:

operate product circuitry to receive a request to generate a recommended configuration data set for the application platform;

operate requirements input management circuitry to:

receive the set of requirements and the set of data definitions; and generate a configuration profile based on the set of data definitions and historical configuration profiles previously generated for the application platform, the configuration profile simulating the configuration settings screen of the application platform;

operate a recommendation engine to:

derive applicable profiles based on the set of requirements and the configuration profile; and automatically generate, by a cognitive recommendation engine using a neural network and applying a deep learning technique, the recommended configuration data set based on the derived applicable profiles, wherein the recommended configuration data set is formatted in a data format that is compatible with the application platform by being at least both readable and executable on the application platform, the recommended configuration data set including configuration profile entries and business rules satisfying the set of requirements based on an analysis of the applicable profiles.

12. The system of claim 11, wherein the processor is further configured to execute the processor executable instructions for implementing the iPROC tool to:

operate the requirements input management circuitry to:

control the communication interface to communicate with the neural network, wherein the neural network is configured to determine the configuration profile entries and the business rules; and control the communication interface to receive the recommended configuration data set from the neural network.

13. The system of claim 12, wherein the recommended configuration data set includes recommended configuration settings for the application platform that satisfy the set of requirements.

14. The system of claim 11, wherein the set of requirements describe at least one of market requirements, business requirements, or regulatory requirements corresponding to the application platform.

15. The system of claim 11, wherein the repository database is associated with the application platform.

16. The system of claim 11, wherein the processor is further configured to execute the processor executable instructions for implementing the iPROC tool to:
transmit the recommended configuration data set to a remote computing device running the application platform.

17. A method for initializing configuration settings of an application platform, the method comprising:
receiving, by a communication interface, a set of requirements for configuring the application platform from a repository database, wherein the set of requirements are uploaded to the repository database by a requirements server;
receiving, by a communication interface, a set of data definitions corresponding to attributes of the application platform from the repository database, wherein the data definitions include definitions of application platform specific data elements in a configuration settings screen of the application platform, the data definitions being uploaded to the repository database by the requirements server;
implementing an intelligent product requirement configurator (iPROC) tool by:
operating product circuitry to receive a request to generate a recommended configuration data set for the application platform;
operating requirements input management circuitry to:
receive the set of requirements and the set of data definitions; and
generate a configuration profile based on the set of data definitions and historical configuration profiles previously generated for the application platform, the configuration profile simulating the configuration settings screen of the application platform;
operating a recommendation engine to:
derive applicable profiles based on the set of requirements and the configuration profile; and
automatically generate, by a cognitive recommendation engine using a neural network and applying a deep learning technique, a recommended configuration data set based on the derived applicable profiles, wherein the recommended configuration data set is formatted in a data format that is compatible with the application platform by being at least both readable and executable on the application platform, the recommended configuration data set including configuration profile entries and business rules satisfying the set of requirements based on an analysis of the applicable profiles.

18. The method of claim 17, wherein implementing the iPROC tool further comprises:
operating the requirements input management circuitry to:
control the communication interface to communicate with the neural network, wherein the neural network is configured to determine the configuration profile entries and the business rules; and
control the communication interface to receive the recommended configuration data set from the neural network.

19. The method of claim 18, wherein the recommended configuration data set includes recommended configuration settings for the application platform that satisfy the set of requirements.

20. The method of claim 17, wherein the set of requirements describe at least one of market requirements, business requirements, or regulatory requirements corresponding to the application platform.

21. The method of claim 17, wherein implementing the iPROC tool further comprises:
transmitting the recommended configuration data set to a remote computing device running the application platform.

22. The method of claim 17, wherein the repository database is associated with the application platform.

* * * * *